Feb. 28, 1933.   A. G. SCHWARTZ ET AL   1,899,641
TRAP
Filed April 21, 1932
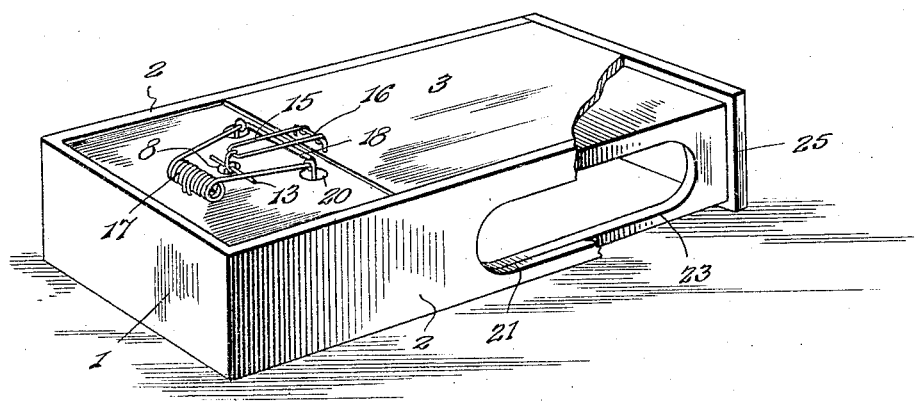
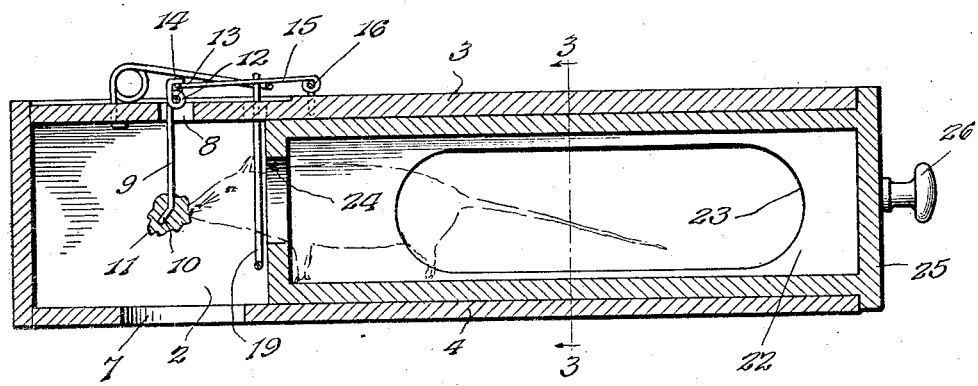
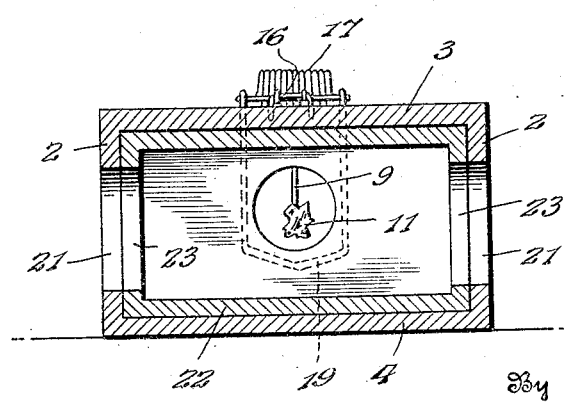
Inventors
A. G. Schwartz.
H. A. Schwartz.
By Lacey & Lacey,
Attorneys Patented Feb. 28, 1933

1,899,641

UNITED STATES PATENT OFFICE

ABRAHAM G. SCHWARTZ AND HARVEY A. SCHWARTZ, OF LONG BRANCH, NEW JERSEY

TRAP

Application filed April 21, 1932. Serial No. 606,726.

This invention relates to traps and is designed more particularly for mouse traps. The invention has for its object the provision of a trap so constructed and arranged that when an animal is caught he will not be exposed to view to agitate the feelings of persons to whom such sight are repugnant, and also to provide a trap in which the caught animal may be removed and the body disposed of in any preferred manner without requiring the body to be directly handled so that the transmission of disease will be guarded against. The invention also provides a trap in which the animal may have ready access to the bait and upon nibbling at the bait will be caught and killed and the body held in such position that it may be removed without being directly handled. The invention is illustrated in the accompanying drawing and consists in certain novel features which will be hereinafter fully described and then particularly defined in the appended claims.

In the drawing, Figure 1 is a perspective view of a trap constructed in accordance with our invention, Fig. 2 is an enlarged central longitudinal section of the same, Fig. 3 is a transverse section on the line 3—3 of Fig. 2.

The body of the trap may be constructed of any preferred material and is preferably rectangular, having an end wall 1, side walls 2, a top 3 and a bottom 4. In the bottom, near the end wall, is an opening 7 which permits the insertion of a person's fingers when the trap is to be baited and set and in the top 3 is a smaller opening 8 through which the bait holder 9 may depend. The bait holder is of well-known form and consists of a wire having a hook 10 at its lower end upon which the bait, indicated at 11, may be secured. Near the upper end of the bait holder is an eye 12 through which a pivot pin 13 is passed, said pin being secured upon the top of the trap at the sides of the opening 8, as clearly shown in Fig. 1. The upper extremity of the bait holder is formed into a finger 14 which is adapted to extend over and rest upon a trigger, as shown and as will be understood. The trigger consists of a loop 15 which is pivoted at one end upon the top of the trap, as shown at 16, and has its opposite end adapted to engage under the finger 14 on the bait holder, as shown in Figs. 1 and 2, so that the bait holder will serve to hold the trigger in lowered position. A coiled torsion spring 17 is secured upon the top of the trap adjacent the end thereof and between the end and the opening 8, as clearly shown in Figs. 1 and 2, and the outer ends of this spring extend inwardly from the end of the trap and are connected by a cross bar 18 which passes under the trigger 15, as shown. Suspended from the side arms of this spring is the choker loop 19 which passes through openings 20 provided therefor in the top of the trap and depends within the bait chamber, as shown in Fig. 2. It will be understood that the animal pokes his head through the choker to reach the bait and in his efforts to consume the bait will rock the bait holder so that the finger 14 will be released from the trigger 15 whereupon the spring 17 at once flies upwardly and draws the choker 19 toward the top of the trap around the throat of the animal. It will be noted at once that by our construction the bait holder and the choker are entirely enclosed within the bait chamber and the animal, when caught, is hidden from sight.

The body of the trap is extended from the bait chamber and in its extended sides are longitudinal slots 21 which are large enough to admit the body of an animal for which the trap is designed. A drawer 22 is disposed between the extended sides of the trap and is constructed in its sides with longitudinal slots 23 adapted to register with the slots 21 and afford access for the animal entering the trap. The drawer has a closed top and is of such form and dimensions that it will fit closely but slidably within the trap body and will be guided between the extended sides of the trap and the top and bottom of the same. The drawer is inserted through the open end of the trap, and, at its inner end, is provided with an opening 24 providing access to the bait chamber for the animal. The opposite end of the drawer is closed by a wall or end plate 25 which is of somewhat greater dimensions than the end of the trap body so that it will impinge against the edges of the sides, top and bottom of the same to limit the entering movement of the drawer, and upon the plate 25 is secured a knob or other handle 26 to facilitate the insertion or removal of the drawer.

After the trap is baited, it is set in the place infested by the mice or other animals with the drawer in its closed position. The animal, attracted by the odor of the bait, may pass easily through the slots 21 and 23 and insert his head through the opening 24 to reach the bait, whereupon he will be caught and choked, as previously described. When the trap is sprung, the fact that an animal is caught will be indicated by the positions of the trigger and the choker, and, to release the animal, the operator presses downwardly upon the choker and then withdraws the drawer 22. If the withdrawn drawer be turned on either side, the body of the animal will drop through a slot 23 to be disposed of as may be deemed desirable. Before the trap is set for another operation, a liberal treatment of the drawer with hot water will thoroughly sterilize it and restore it to a sanitary condition so that the liability of disease germs being communicated to the user of the trap will be overcome and it will be obvious that direct handling of the body of the animal is avoided by the provision of the drawer. Inasmuch as the bait holder and choker are housed within the bait chamber and the opening through the bottom of the bait chamber is covered by the ground or the floor of the floor of a room when the trap is placed in position near a mouse hole or other infested place there is no liability of children or others being injured by accidentally springing the trap. The trap may be constructed at a very slight expense and has been found highly efficient in use.

The bait chamber is defined by the side and end walls of the trap body and the inner end of the drawer, and it should be noted that the choker is located close to the position assumed by the inner end of the drawer when the drawer is in place. Consequently, it is not necessary for the mouse to insert any part of his body into the bait chamber, and the opening 24 is only large enough to admit the head of the animal, the arrangement insuring ready release of the dead animal when the choker is depressed. The opening 24 is located somewhat above the center of the inner end wall of the drawer and the caught animal's body will be suspended in such position that the choking will be certain and the weight of the body will keep it in the drawer until the drawer is turned into discharging position.

Having thus described the invention, we claim:—

1. A trap comprising a body having an open end, a drawer slidably fitted in the body and provided with an opening through its inner end, a bait chamber being defined between the drawer and the closed end of the body, a bait holder and a choker within the bait chamber, the choker being disposed adjacent the partition and around the opening therein, and means upon the top of the body for springing the same.

2. A trap comprising a body having a bait chamber in one end and provided between the bait chamber and its opposite end with longitudinal slots in its sides, and a drawer removably fitted between the sides of the body and provided with slots in its sides to register with the slots in the sides of the trap body and provided in its inner end with an opening to permit the insertion of an animal's head into the bait chamber.

In testimony whereof we affix our signatures.

ABRAHAM G. SCHWARTZ. [L. S.]
HARVEY A. SCHWARTZ. [L. S.]